United States Patent
Zhang et al.

(10) Patent No.: US 9,141,986 B1
(45) Date of Patent: Sep. 22, 2015

(54) MOBILE MESSAGING DATA MANAGEMENT

(75) Inventors: Jianguo Zhang, Bellevue, WA (US); Aleksandrs J. Rudzitis, Seattle, WA (US); Gaurav Jain, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 45 days.

(21) Appl. No.: 13/493,729

(22) Filed: Jun. 11, 2012

(51) Int. Cl.
G06Q 30/00 (2012.01)
G06Q 30/06 (2012.01)

(52) U.S. Cl.
CPC .................. G06Q 30/0625 (2013.01)

(58) Field of Classification Search
USPC ............................... 705/26.1–27.2
See application file for complete search history.

(56) References Cited

U.S. PATENT DOCUMENTS

2006/0059048 A1* 3/2006 Frentzel-Beyme et al. ..... 705/26
2008/0016501 A1* 1/2008 Muhlestein et al. .......... 717/136
2009/0070300 A1* 3/2009 Bartels et al. .................. 707/3
2010/0049774 A1* 2/2010 Pathak et al. ................ 707/803
2012/0117050 A1* 5/2012 Vasudevan et al. .......... 707/706
2012/0123884 A1* 5/2012 Bhasin ........................ 705/21

OTHER PUBLICATIONS

Shair, D. (1999). Training register offers personal help, modest cost. HRMagazine, 44(12), 126-128. Retrieved from http://search.proquest.com/docview/205058349?accountid=14753 [recovered from ProQuest on Apr. 10, 2014].*
Wikipedia, "Overview of a three-tier application," retrieved May 17, 2012 from <http://en.wikipedia.org/wiki/File:Overview_of_a_three-tier_application_vectorVersion.svg>.

* cited by examiner

*Primary Examiner* — Kathleen Palavecino
(74) *Attorney, Agent, or Firm* — Knobbe Martens Olson & Bear LLP

(57) ABSTRACT

A mobile messaging data management service is disclosed. Using a computing device, a merchant or other user of the service may transmit an operation to be run on data in a data store to an interactive computing system. In some embodiments, the operation is transmitted as part of a short messaging service (SMS) message. The interactive computing system may process the operation, and return the results to the computing device from which the message was received. The data management service may also enable a merchant or other user to specify one or more custom operations for future use.

22 Claims, 7 Drawing Sheets

MOBILE MESSAGING DATA MANAGEMENT

BACKGROUND

Generally described, computing devices and communication networks facilitate network-based commerce. For example, a user such as a customer may employ his or her computing device to access a network-based service for the purchase of items and services (collectively and individually referred to as "items") such as music, books, and electronics, just to name a few.

A merchant may be affiliated with the network-based service. The merchant may buy, sell, trade, barter, broker, or otherwise interact with goods and services in commerce by using the network-based service. Typically, the merchant manages his or her merchant data (e.g., information regarding his or her inventory, order fulfillment, finances, and the like) through one or more content pages hosted by the network-based service. For example, the merchant may use a web browser installed on his or her computing device to access the content pages hosted by the network-based service. The merchant can retrieve, update, and otherwise manipulate or interact with his or her merchant data through the content pages.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Introduction

Figure 1:
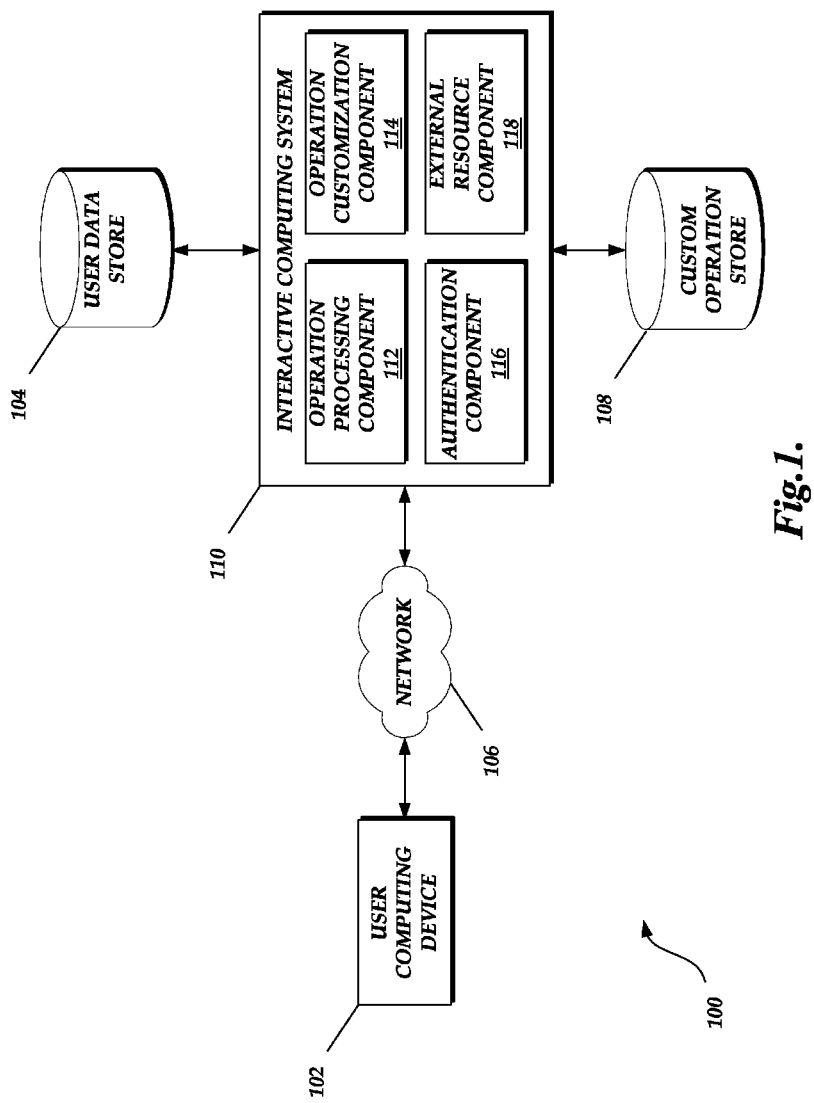
FIG. 1 depicts an embodiment of a network environment in which the data management service may operate.

As discussed above, merchants and other users may interact with one or more content pages hosted on a network to manage their data. For example, a merchant may access a content page hosted by a network-based service using a computing device on which a web browser is provided. However, in some circumstances, access to content pages hosted by the network-based service may be difficult or even impossible to obtain. For example, certain computing devices may not be configured to access the network on which the content page is hosted. Such a computing device might be insufficient for a merchant to manage his or her merchant data. In another example, a computing device may not be able to display the content page properly. Further, in many parts of the world, merchants and other users conduct business using cell phones that are not equipped with web browsers, or even if equipped, may be difficult or inefficient to use. A merchant may instead rely on messaging (such as text or voice messages) to conduct business. In still a further example, a merchant may not have access to computing device that can provide meaningful access to the content pages maintained by the network-based service. For example, the merchant may be traveling or in a remote or rural location and may not have access to content pages via a browser.

Accordingly, aspects of the present disclosure pertain to an interactive computing system with which merchants and other users may interact through messages. In this regard, a data management service is disclosed. In one embodiment, a user of a user computing device generates a message specifying an operation to be performed on a user data store. Example operations may include adding information to the user data store; retrieving information from the user data store; updating or adding to information already contained in the user data store; and deleting information from the user data store. An interactive computing system may receive the message specifying the operation from the user computing device, run the specified operation on the user data store, and return the results of the operation to the user computing device as a message that includes the result or as a network resource link to a content page that includes the result.

In some embodiments, the user data includes merchant data. Merchant data may describe or provide information about, for example, orders placed with or by the merchant; the merchant's inventory; the merchant's finances; the merchant's suppliers or customers; or other information related to the merchant's business. Merchant data may classified by aspects of a merchant's business. Types of merchant data may include personnel data; customer data; supplier data; and other types of data related to the merchant's business.

Merchant data (and more generally, user data) may also contain one or more attributes, and a value for one, some, or all of the attributes. For example, a merchant data for an order placed with the merchant may include attributes such as a unique order identifier; the fulfillment status of the order; the name of an item ordered; the quantity ordered of an item; the price of an item; the shipping address of the customer that placed the order; the merchant's revenue from the order; the date of the order; and so forth. The values for each of these attributes may provide specific information about the order. For example, values for the fulfillment status attribute might include "SHIPPED," "UNSHIPPED," "REJECTED," "RETURNED," "DELIVERED," "LOST," and so forth. In another example, values for the name of an item in the order might be an alphanumeric part number specified by the merchant, such as "WIDGETS;" a standard identification number for the item, such as a Universal Product Code or International Standard Book Number; or a descriptive name of the item, such as "Blue Widget."

The data management service may provide a language for specifying operations to be performed on user data stored in the user data store. This language may include a simplified variant of structured query language (SQL) that enables the merchant to specify various operations (such as querying the user data store to retrieve information, or such as updating merchant data in the user data store) to be performed on the merchant data in the user data store. This language can be easy to understand for merchants and other users and lends itself to a message format that may be conveniently used with a user computing device. These operations may be indicated by operators, which may be words or phrases related to a particular operation. Multiple operators may be associated with the same operation. For example, for an operation involving retrieving data from the user data store, operators might include "RETRIEVE," "FIND," or "GET." For an operation involving updating data, operators might include "UPDATE," "MODIFY," or "CHANGE." A table of example operators is provided herein, although many different operators may be supplied for use on merchant data and on user data generally:

TABLE 1

| Operation | Example Operator(s) |
| --- | --- |
| Create new user data | CREATE, GENERATE |
| Retrieve a value of an attribute of user data, or retrieve user data fitting one or more criteria | RETRIEVE, FIND, GET |
| Update or change a value of user data | UPDATE, MODIFY, CHANGE |
| Delete user data | DELETE, DESTROY, DROP |

This language may have the added benefit of preventing attacks on user data, such as SQL injection.

The user may also provide criteria in the message to designate the particular user data upon which the operation should be performed. In some embodiments, these criteria are filters that specify the user data on which the operation should be performed. For example, the user may desire that an operation be performed only on user data having a particular attribute, or only on user data with a particular value for an attribute. For example, a merchant may request a list of all unshipped orders. Accordingly, the merchant may generate a message such as "GET ALL ORDERS WHOSE STATUS IS UNSHIPPED." This particular message has three criteria. The first criterion is a merchant data type criterion. Here, the merchant has requested merchant data with the "order" type. The second criterion is an attribute criterion. Here, the merchant has requested merchant data that includes a "status" attribute. The third criterion is a value criterion. Here, the merchant has requested merchant data whose value for the "status" attribute is "unshipped." Upon receiving this message from the user computing device, the data management service may search in the user data store for all merchant data corresponding to the designated type (orders) that have an attribute (fulfillment status) with a particular value (unshipped). The merchant data contained therein may be retrieved by the data management service and then transmitted to the user computing device as a message.

In some embodiments, the message that specifies the operation to be performed is a text message. A user may generate a text message specifying an operation (e.g., by inputting one or more operators and/or criteria) on his or her user computing device and cause the message to be transmitted over the network to the interactive computing system. Text messages as described herein may be in one of a variety of formats. For example, text messages may include Short Message Service (SMS) messages; Enhanced Messaging Service (EMS) message; Extended Messaging Service (XMS) messages; Multimedia Messaging Service (MMS) messages; electronic mail messages; instant messaging service messages; micro-blogging messages (such as "tweets"); and other types of messages that support text.

Other message formats may also be supported by the data management service as well. For example, messages that include audio content may be transmitted to the interactive computing system for processing. Speech recognition may be performed to identify an operation specified in a verbal instruction (e.g., a portion of the verbal instruction during which the user spoke an operator or criterion) captured by the user computing device (e.g., through a microphone or receiver). For example, the data management service may transcribe the verbal instruction into an operation text message, either on the user computing device or at the interactive computing system. The interactive computing system may generate a results message in response to the verbal instruction that may include a text message or a voicemail generated through speech synthesis techniques.

The data management service may also enable the user to define customized operations, such as custom queries, updates, deletions, etc. In one embodiment, the data management service may provide a content page that may be accessed over a network by the user for defining customized operations, such as queries. The content page may enable the user to select one or more operators and/or one or more criteria for selecting user data over which the operators should run. The user may also assign an alias to this custom operation. By sending a message including the alias to the interactive computing system, the user may cause the customized operation to be run on the user data store without having to input the operators, criterion, or other syntax for each operation message. Returning to an above example, the operation "GET ALL ORDERS WHOSE STATUS IS UNSHIPPED" may be constructed from the operators "GET" and "WHOSE," the type criterion "ORDER," the attribute criterion "STATUS," and the attribute value criterion "UNSHIPPED." The user may also assign the alias "MYQUERY1" to the operation. The data management service may store this customized operation so that when the user computing device transmits a message to the interactive computing system including the alias "MYQUERY1," the customized operation may be run.

In some embodiments, a customized operation is defined on computing device other than the user computing device. For example, the user computing device may not be able to display content pages or may lack the network connectivity required to access the content page. Accordingly, the user may use a different computing device with the requisite network connectivity and/or display capacity to define the customized operation and to assign an alias to it. The user may then use his or her user computing device to transmit a message including the alias for the customized operation to the interactive computing system, whereupon the interactive computing system may perform the customized operation on user data stored in the user data store.

In some cases, the merchant or other type of user may generate a message using his or her user computing device, but the message may be an unstructured message, e.g., it may not explicitly include operators, criterion, or other syntax (such as SQL syntax) recognized by the data management service. As an example, the unstructured message may be in natural language text. The merchant or other user may be unfamiliar with the language of the data management service and therefore use natural language text instead of more structured query text. The data management service can use one or more natural language processing techniques to analyze the message to attempt to identify an operation and/or a criterion suggested or indicated by the unstructured message. In this respect, certain embodiments of the data management service may advantageously reduce the complexity of the data management service for an end user.

For convenience, aspects of this disclosure are described herein primarily with respect to merchants. However, it should be understood that the principles of this disclosure may be applied to users generally (of which merchants may be a subset) and user data generally (of which merchant data may be a subset). For example, a customer may be a user that accesses the interactive computing system using text messages to obtain information about order status or to update information about orders. Further, some users may be both customers and merchants of the interactive computing system. In such cases, the interactive computing system may provide functionality for users to send and receive messages to and from the system regarding both customer and merchant activity.

Moreover, the interactive computing system and messaging activity described herein can be implemented for environments and applications other than retail environments or applications. The data management service may be employed in environments where items are not sold, but rather are borrowed, rented, discussed, reviewed, loaned, exchanged, auctioned, shared, donated, traded, bartered, etc. For example, the data management service may be employed to manage donations for a charitable organization, or to manage demographic, taxation, or logistical information for a government entity. Other applications of the data management service are also possible.

SYSTEM AND PROCESS EXAMPLES

Turning to FIG. 1, a block diagram of an embodiment of a network environment 100 is shown. The network environment 100 includes a user computing device 102; a user data store 104; a network 106; a custom operation store 108; and an interactive computing system 110.

The user computing device 102 may be any computing device capable of communicating over the network 106, such as a laptop or tablet computer, personal computer, personal digital assistant (PDA), hybrid PDA/mobile phone, mobile phone (e.g., a smart phone or feature phone with or without a web browser), electronic book reader, set-top box, camera, audiobook player, digital media player, video game console, in-store kiosk, television, one or more processors, integrated components for inclusion in computing devices, appliances, electronic devices for inclusion in vehicles or machinery, gaming devices, or the like. In some embodiments, the user computing device 102 is a wireless communication device capable of sending and receiving messages to and from the interactive computing system 110.

The user computing device 102, which may be operated by a merchant or other type of user may generate messages that may be transmitted over the network 106. These messages may contain operations to be performed by the interactive computing system 110 on the user data store 104. For example, hardware or software keys may be provided with the user computing device 102, through which a merchant or other type of user using the user computing device 102 may generate messages. In another example, a speech recognition engine may be included with the user computing device 102. The speech recognition engine may capture a user's verbal instruction (e.g., through a microphone or receiver) and convert the verbal instruction into a text message to be transmitted over the network 106. In still another example, the user computing device 102 may transmit voice messages over the network 106 for processing by the interactive computing system 110. For example, a user may provide a verbal instruction to the user computing device 102 (e.g., through a microphone or receiver), whereupon the verbal instruction may be transmitted over the network 106 for processing by the interactive computing system 110. As with the user computing device 102, the interactive computing system 110 may be equipped with a speech recognition engine such that it may convert the received verbal instruction into a text message. Still other ways of generating and transmitting a message over the network 106 are possible.

The network 106 may be any wired network, wireless network or combination thereof. In addition, the network 106 may be a personal area network, local area network, wide area network, cable network, satellite network, cellular telephone network, or combination thereof. Protocols and components for communicating via the Internet or any of the other aforementioned types of communication networks, such as the TCP/IP protocols, can be used in the network 106.

The user data store 104 may be an electronic data store that stores user data, such as merchant data. User data may be stored in a variety of database formats. In some embodiments, the user data is stored in a flat file database. In other embodiments, the user data is stored in a relational database. In still further embodiments, the user data is stored in a hierarchical database. Other types of databases may be used as well, such as non-relational databases termed "No-SQL" databases (examples of which include key-value data stores based on BigTable by Google™ and the Hadoop database by The Apache Software Foundation). Additionally, user data may be stored in multiple database formats within the same user data store 104. For example, some user data may be stored in a flat file database, while other user data may be stored in a relational database. The details of user data are discussed below with respect to FIG. 2. User data may also be associated with one or more particular users.

In some embodiments, the user data store 104 also stores an electronic catalog that includes data representing items, such as products or services that can be purchased by a user. Further, in one embodiment, users can access the electronic catalog by searching for items or by browsing categories in the catalog, which categories may be hierarchically arranged in a browse-tree structure. A merchant may also have an associated catalog in the user data store 104. Merchants may also be able add or remove products or services to their associated electronic catalog through the data management service, e.g., by transmitting operation messages indicating that the catalog should be updated or modified in some way. Still other operations may be performed on data in the electronic catalog.

The custom operation store 108 may be an electronic data store that stores one or more customized operations associated with a user. A customized operation, such as a custom query to be run on the user data to retrieve information therefrom, may include one or more operators and/or criteria selected by a user. The user may associate the operators and criteria with an alias, and generate a message on his or her user computing device 102 that includes the alias. If the interactive computing system 110 receives a message from the user computing device 102 that includes the alias, the customized operation may be performed. In this way, the user may conveniently have the interactive computing system 110 perform complex or detailed operations without needing to specify all of the operators or criteria in the operation message.

The user data store 104 and the custom operation data store 108 may be embodied in hard disk drives, solid state memories, and/or any other type of non-transitory computer-readable storage medium. The user data store 104 and the custom operation data store 108 may be distributed or partitioned across multiple storage devices as is known in the art without departing from the spirit and scope of the present disclosure. Moreover, while the user data store 104 and the custom operation data store 108 are depicted in FIG. 1 as being local to the interactive computing system 110, the user data store 104 and the custom operation data store 108 may be remote to the interactive computing system 110.

While user data store 104 and the custom operation data store 108 are depicted in FIG. 1 as distinct data stores, they may be integrated into one combined data store in some embodiments. The user data store 104 and the custom operation data store 108 may also be integrated into the interactive computing system 110.

The interactive computing system 110 may include one or more computing devices that implement the functionality of the data management service. In the depicted embodiment, the interactive computing system includes an operation processing component 112; an operation customization component 114; an authentication communication component 116; and an external resource component 118.

The operation processing component 112 may process an operation message received over the network 106 by the interactive computing system 110 from the user computing device 102. The operation processing component 112 may identify an operation included in the operation message received from the user computing device 102 by the interactive computing system 110. As discussed above, the operation may specify one or more operators to be performed on user data as specified by one or more criteria. The operation processing component 112 may access the user data store 104, select or designate user data based on the provided criteria, and apply the operators to the selected or designated user data.

The results of the operation on the user data may be obtained by the operation processing component 112 and then transmitted back over the network 106 to the user computing device 102. The operation processing component 112 may generate a message comprising the results of the operation and transmit the message over the network 106 to the user computing device 102. The operation processing component 112 may also (or instead) generate a content page comprising the results of the operation, and transmit a message including a network resource link to the generated content page to the user computing device 102. The user may then interact with the network resource link using his or her user computing device 102 to access the content page and see the result.

The results of an operation may vary based on the operators and criterion included in the operation. For example, if the operation message includes a request to obtain information from user data, the results of that request for information (e.g., the value of an attribute, or a count of user data having a particular value for an attribute) may be transmitted to the user computing device 102. If the operation message requested a modification or deletion of user data, a confirmation or notification of the results of the modification or deletion may be transmitted to the user computing device 102. The result message may also simply include an acknowledgement that the operation message was received.

In some cases, a user may send a partially or wholly unstructured operation message from his or her user computing device 102 to the interactive computing system 110, due perhaps to a lack of familiarity with the language of the data management service or for some other reason. In some embodiments, the operation processing component 112 may attempt to parse out operators and/or criteria in the unstructured message. In one embodiment, the operation processing component 112 may use an electronic dictionary, thesaurus, or look-up table to identify synonyms for pre-defined operators and/or criteria present in the unstructured message. For example, an operation message may include, "SHOW AN ADDRESS FOR BILL BUYER." The operation processing component 112 may recognize that "SHOW" is a synonym for "GET," and may retrieve Bill Buyer's address from user data in the user data store 104. In another embodiment, the operation processing component 112 uses natural language processing techniques known in the art to identify operators and/or criteria. For example, the operation message may include, "How many orders have I not shipped yet?" Natural language processing techniques may be used to translate this unstructured message into an operation, such as the operation "GET COUNT OF ORDERS WHOSE STATUS IS UNSHIPPED."

In some cases, the operation processing component 112 may perform operations on user data in the user data store 104 automatically, without prompting by a message from the user. For example, the operation processing component 112 may periodically search for user data with particular values for a certain attribute. In one example, the operation processing component 112 may perform an operation to search for order user data with an "unshipped" value for the attribute "fulfillment status" and whose value for the attribute "order date" indicates that the order was placed a day, week, or month ago. If such user data is found, the operation processing component 112 may retrieve the value in the "order identifier" field for that user data and generate a message to be transmitted over the network 106 to the user computing device 102 in order to alert the user that the order remains unshipped. In another example, the operation processing component 112 may perform an operation to search for order user data that has a "rejected" or "lost" value for the attribute "fulfillment status." If such user data found, the operation processing component 112 may retrieve the value in the "order identifier" field and generate a message to be transmitted over the network 106 to the user computing device 102 in order to alert the user that the order was lost or rejected.

The operation customization component 114 may enable the user to develop custom operations for use with the data management service. Generally described, a custom operation may include one or more operators and/or criteria selected by the user. In one embodiment, the operation customization component 114 provides a content page that may be accessed over the network 106 by the user computing device 102 or any computing device that may access and render a content page. The content page may provide a user interface to enable the user to assign one or more operators and criteria to be associated with an alias describing the custom operation. An example user interface that may be included with a content page is shown in and discussed below with respect to FIG. 6.

Once the user has customized the operation and alias to his or her liking, the operation customization component 114 may save the customized operation to the custom operation store 108 for future retrieval and use. For example, if the user sends a message that includes the alias from his or her user computing device 102 over the network 106 to the interactive computing system 110, the operation customization component 114 may retrieve the custom operation with the alias from the custom operation store 108 and provide it to the operation processing component 112. The operation processing component 112 may then apply the operators and criteria included in the custom operation to user data stored in the user data store 104, generate a message including the result of the operation, and transmit the results in a message over the network 106 to the user computing device 102.

The operation customization component 114 may also be used to define custom operations to be performed automatically by the interactive computing system 110. For example, the user may wish to be notified automatically if an order has been lost. Accordingly, the user may, through a content page provided by the operation customization component 114, specify certain custom operations to be performed automatically by the interactive computing system 110. For example, a merchant may specify that the interactive computing system 110 should automatically search the user data store 104 for merchant data whose "fulfillment status" attribute has a "lost" value. The user may specify that this custom operation and/or other custom operations should be performed automatically once an hour, once a day, once a week, with some other regular frequency, or even at random intervals.

It should be appreciated that the user computing device 102 may include an operation customization component 114 as well. Instead of content pages, a software application or application-specific hardware may be provided with the user computing device 102 to cause the user computing device 102 to render a user interface through which the user may specify custom operations. These custom operations defined by the user may be stored on the user computing device 102. For example, the user computing device may, upon determining that the user has generated a message that includes the alias associated with the custom operation, translate that message into the operators and criteria that make up the custom operation and transmit the translated message to the interactive computing system 110. Alternately, the user may direct the user computing device 102 to transmit the operators, criteria, and alias of the custom operation to the custom operation store 108 via the interactive computing system 110.

The authentication component 116 may provide security features for the interactive computing system. As discussed above, in some embodiments, user data may be associated with a particular user. Access to user data associated with a particular user may be restricted to the user with whom the user data is associated. Operations may only be performed on user data associated with a particular user if the interactive computing system 110 determines that a message that it has received is associated with that particular user.

A user may authenticate a message in a variety of ways. In one embodiment, the user may register his or her user computing device 102 with the authentication component 116. For example, the user may register a secure user identifier for his or her user computing device 102 (e.g., a phone number, static network address, MAC address, or the like) with the authentication component 116. If the authentication component 116 determines that an operation message received by the interactive computing system 110 originated from a user computing device 102 matching the security credential, the operation message may be authenticated and the operation in the message may be processed by the operation processing component 112. In another embodiment, a user is associated with a security credential, such as password, personal identification number (PIN), digital certificate, or digital signature. The user may be required to include the security credential in or with the operation message for it to be authenticated by the authentication component 116 and processed by the operation processing component 112. Still other ways to authenticate operation messages are possible.

Additionally, whether a user is required to authenticate an operation message may depend on the operation. For example, a merchant may be required to provide authentication for an operation message that requests relatively sensitive information from the user data store 104, such as a customer's shipping address or payment information. For less sensitive operations, such as an operation requesting information about the price of an item, the user may not be required to provide authentication with the operation message. Authentication is optional or not implemented in some embodiments.

The external resource component 118 may allow the interactive computing system 110 to interact or receive information from one or more external resources. The external resources are not depicted in FIG. 2 so as not to obscure the principles of the present disclosure, but are described herein to illustrate the principles of the present disclosure. Information from an external resource, such as a network-based service, may be obtained by the external resource component 118 and provided to the operation processing component 112. The operation processing component 112 may then create, retrieve, update, or delete user data in the user data store 104 accordingly.

In one embodiment, the external resource component 118 obtains information about orders placed with the merchant from a network-based service with which the merchant is affiliated. When a customer places an order with the merchant on the network-based service, the external resource component 118 may obtain information about the order and provide that information to the operation processing component 112. The operation processing component 112 may then create order merchant data corresponding to the order. The created order merchant data may include attributes such as the customer's name, shipping address, quantity and types of items ordered, and the like, with values associated with each attribute. In another embodiment, the external resource component 118 obtains information about an order shipped by the merchant from a shipping company. For example, the shipping company may host one or more content pages that may be accessed over the network 106 that may enable the merchant to track the shipping status of an order. The external resource component 118 may obtain this tracking information and provide it to the operation processing component 112, which may then update the value of the attribute "fulfillment status" of an order from "shipped" to "delivered" or some other value based on the tracking information.

The user computing device 102 and interactive computing system 110 may each be embodied in a plurality of components, each executing an instance of the respective user computing device 102 and interactive computing system 110. A server or other computing system implementing the user computing device 102 and interactive computing system 110 may include a network interface, memory, processing unit, and non-transitory computer-readable medium drive, all of which may communicate with each other by way of a communication bus. Moreover, a processing unit may itself be referred to as a computing device. The network interface may provide connectivity over the network 106 and/or other networks or computer systems. The processing unit may communicate to and from memory containing program instructions that the processing unit executes in order to operate the user computing device 102 and interactive computing system 110. The memory generally includes RAM, ROM, and/or other persistent and/or auxiliary, non-transitory computer-readable storage media (additional examples of which are described below under the section entitled "Terminology").

Many of the devices described above are optional, and embodiments of the environment 100 may or may not combine devices. Furthermore, devices need not be distinct or discrete. Devices may also be reorganized in the environment 100. For example, the interactive computing system 110 may be represented in a single physical server or, alternatively, may be split into multiple physical servers. The entire data management service may be represented in a single user computing device 102 as well.

Figure 2:
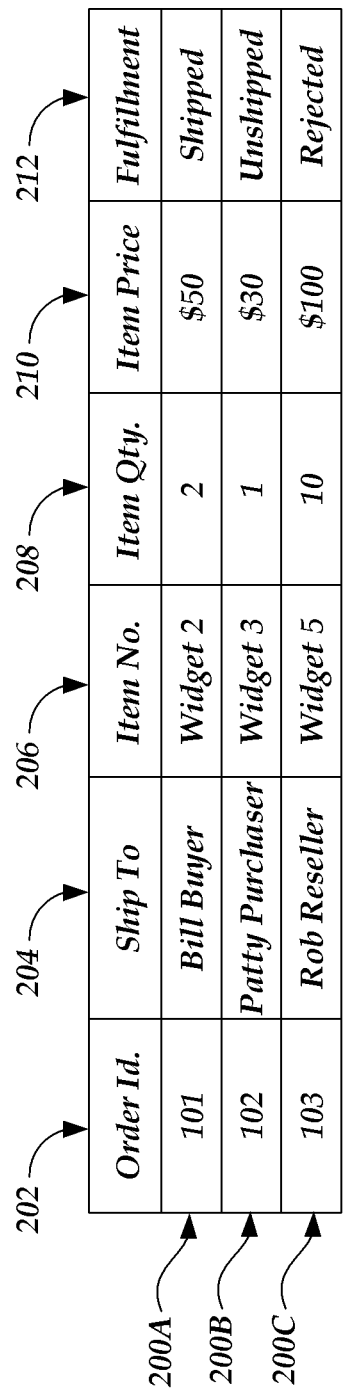
FIG. 2 depicts example merchant data.

FIG. 2 is a diagram that depicts example user data, shown here as merchant data 200A-200C. As discussed above, merchant data 200A-200C may have a type. Generally described, a merchant data type relates to an aspect of the merchant's business about which the merchant data provides information. For example, types of merchant data may include data about orders placed with the merchant; data about the merchant's personnel; data about the merchant's suppliers; data about the merchant's customers; and so forth. In FIG. 2, the example merchant data 200A-200C relate to orders placed with the merchant.

The merchant data 200A-200C may include one or more attributes relevant to the type of the merchant data. For example, attributes relevant to order merchant data may include unique order identifiers 202; the name of the customer that placed the order 204; the name or part number of an item ordered 206; the quantity ordered of an item 208; the unit price of an item 210; and the fulfillment status of the order 212. Other attributes that may be included in order merchant data 200A-200C are a shipping address of the customer that placed the order; the merchant's revenue from the order; the total price of the order; the date of the order; and so forth.

Some attributes may be common to multiple types of merchant data. For example, customer merchant data may include an attribute for the customer's name and shipping address. Likewise, order merchant data may include attributes for the customer's name and shipping address, among other attributes.

The attributes of merchant data 200A-200C may have a value. Generally described, a value may be a particular description of an attribute's level, quantity, status, or the like for the merchant data. For example, the value of a unique order identifier 802 in order merchant data may be the order's alphanumeric tracking number as assigned by a shipping service. The possible values of the fulfillment status 212 of order merchant data might include "SHIPPED," "UNSHIPPED," "REJECTED," "RETURNED," "DELIVERED," "LOST," and the like. For example, merchant data 200A has a value of "shipped" for the fulfillment status attribute 212, while merchant data 200B has a value of "unshipped" for the fulfillment status attribute 212.

Figure 3:
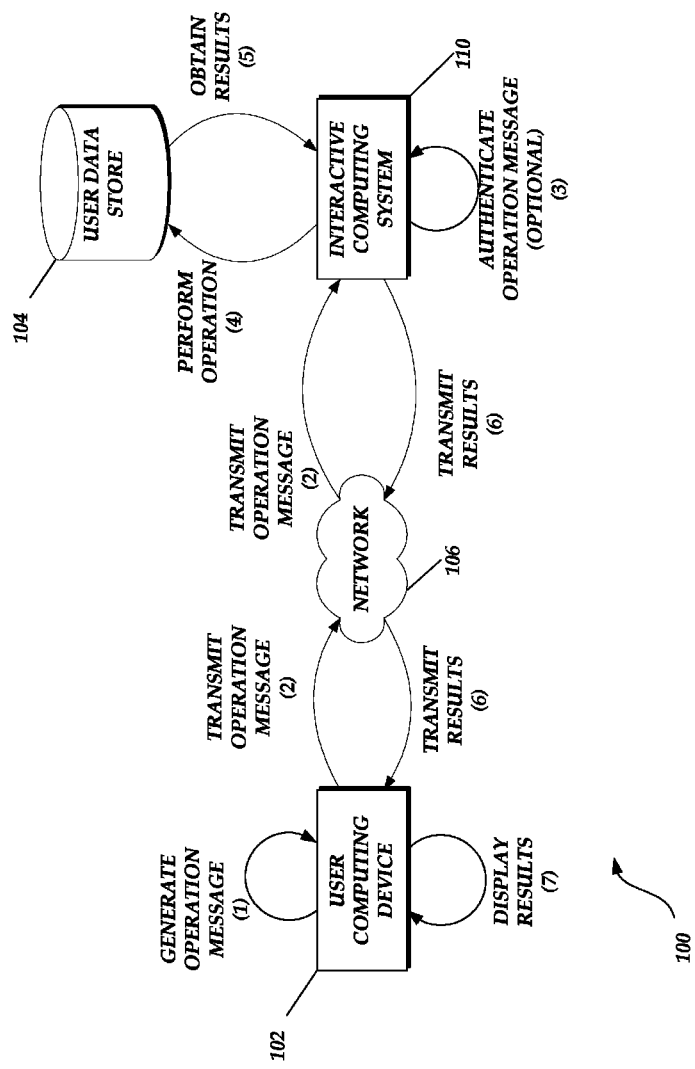
FIG. 3 depicts an embodiment of a routine for performing an operation on user data stored in a user data store.

FIG. 3 is an example state diagram depicting a routine for performing operations on user data stored in of the user data store 104. Two example implementations in the network environment 100 are described herein, but many other implementations are possible.

In a first example implementation, a user may generate an operation message (1) using his or her user computing device 102. As discussed above, the operation message may include one or more operators and/or one or more criteria that determine what user data in the user data store 104 receive the operation. Alternately, the operation message may be in an unstructured form capable of being translated or parsed into one or more operators or criteria by the interactive computing system 110. This operation message may be transmitted (2) from the user computing device 102 over the network 106 to the interactive computing system 110. The interactive computing system 110 may optionally authenticate the operation message (3) as discussed above with respect the authentication component 116 depicted in FIG. 1. The interactive computing system 110 may then perform the operation (4) on the user data store 104 and obtain the results of the operation (5) as discussed above with respect to the operation processing component 112 depicted in FIG. 1. The interactive computing system 110 may then transmit (6) a result message that includes the result of the operation, a graph of the operation (e.g., creating a chart based on user data or a link to a content page that includes the result of the operation over the network 106. The result message may also simply include an acknowledgement that the message was received. The user computing device 102 may, upon receiving the result message, display the result (7).

In a second example implementation, the user may have instructed the interactive computing system 110 to perform one or more operations automatically. For example, the user may have defined an operation to be performed automatically in certain circumstances, such as in response to a change in a value of an attribute, or after the passage of a certain period of time. For example, a merchant may wish to be notified if order merchant data has the value of its "fulfillment status" attribute changed to "lost" in response to shipping tracking information received from an external resource and processed by the external resource component 118 shown in and described with respect to FIG. 1. Accordingly, the interactive computing system 110 may automatically perform an operation (4) on the user data store 104 and obtain the results of the operation (5) as discussed above with respect to the operation processing component 112 depicted in FIG. 1. The interactive computing system 110 may then transmit (6) a result message that includes the result of the operation or a link to a content page that includes the result of the operation over the network 106. The user computing device 102 may, upon receiving the result message, display the result (7).

Figure 4:
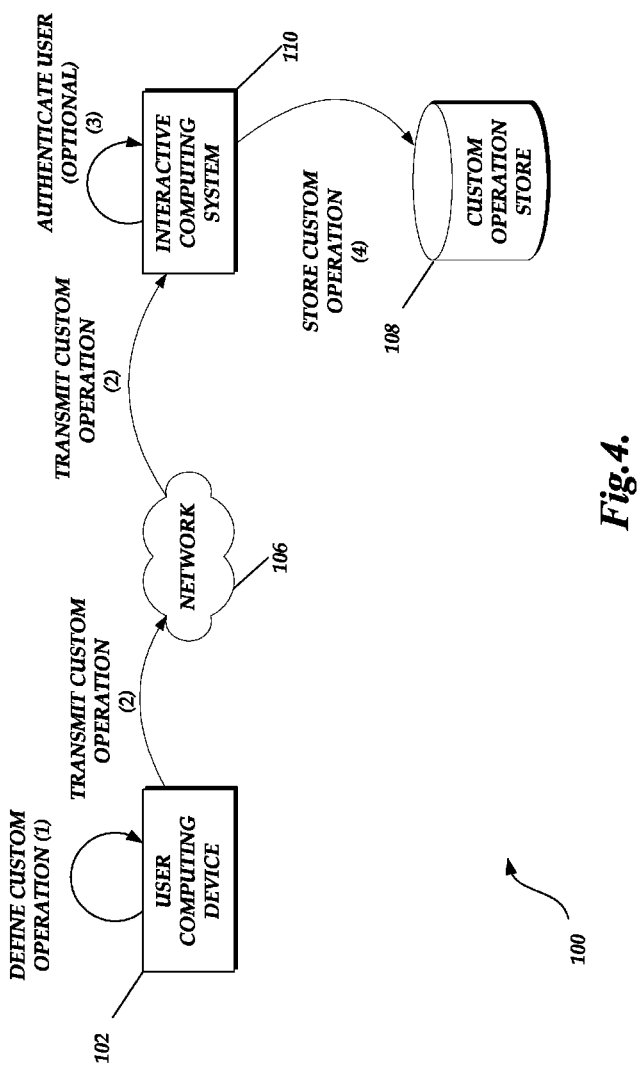
FIG. 4 depicts an embodiment of a routine for generating custom operations that may be performed on user data stored in a user data store.

FIG. 4 is an example state diagram depicting a routine for defining custom operations for use upon user data stored in the user data store 104. Two example implementations in the network environment 100 are described herein, but many other implementations are possible.

In the first example implantation, the user computing device 102 may define the custom operation (1). The user computing device 102 may be provided with a software application or application-specific hardware that provides a user with the ability to define and/or modify a custom operation (such as a query to retrieve user data or an update to modify user data) by selecting one or more operators and/or criteria. For example, the user computing device 102 may render a user interface through which operators, criteria, and an alias may be selected to define a custom operation. The custom operation may be transmitted (2) over the network 106. Optionally, the definition of the custom operation may be authenticated (3) by the interactive computing system 110. For example, the authentication component 116 as shown in and described with respect to FIG. 1 may require the user to provide a security credential or to register his or her user computing device 102 to define or modify a custom operation. The custom operation may then be stored (4) in the custom operation store 108 for future retrieval and use by the interactive computing system 110. For example, when the user computing device 102 transmits a message including the alias to the interactive computing system 110, the custom operation may be retrieved from the custom operation store 108 and performed by the interactive computing system 110 on the user data store 104 (not pictured).

In the second example implementation, the user computing device 102 is capable of rendering one or more content pages made available over the network 106 by the interactive computing system 110. The content page may include a user interface for defining and/or modifying a custom operation by selecting one or more operators, criteria, and aliases. Accordingly, the user may access the content page over the network 106 through a network browser on the user computing device 102. The user may define a custom operation (1) through the user interface provided on the content page. This defined custom operation may be transmitted (2) over the network 106 and optionally authenticated (3) as discussed above. For example, the user may be required to provide a security credential to the interactive computing system 110 or register his or her user computing device 102 with the interactive computing system 110 in order to be authenticated for access the content page to define or modify a custom operation. The custom operation may then be stored (4) in the custom operation store 108 for future retrieval, use, and modification by the interactive computing system 110. For example, when the user computing device 102 transmits a message including the alias to the interactive computing system 110, the custom operation may be retrieved from the custom operation store 108 and performed by the interactive computing system 110 on the user data store 104 (not pictured).

Figure 5B:
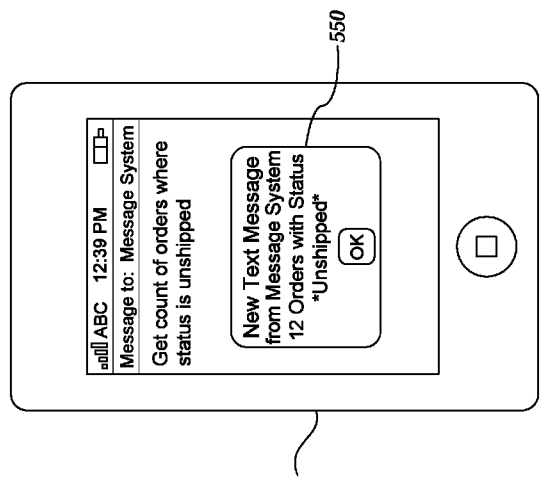
FIG. 5A and FIG. 5B depict embodiments of user interfaces that depict example an operation message and an example result message of the example query.
Figure 5A:
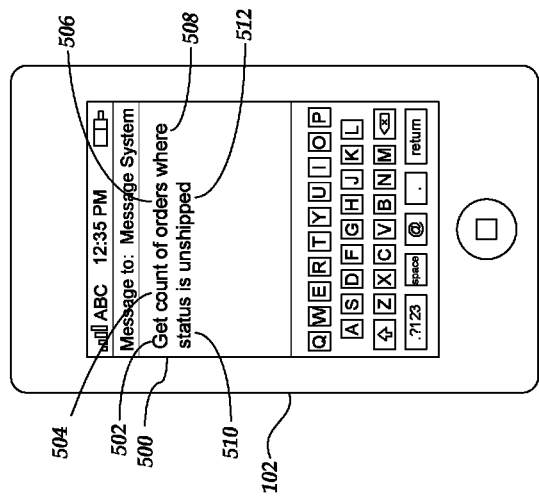

FIG. 5A depicts an example of a user computing device 102 with an example operation message 500. As discussed above, an operation message 500 may include one or more operators and one or more criteria that indicate which operators should be applied to what user data. As also discussed above, an operation text message may be in a variety of formats, such as a format that supports text messages or a format that supports voice messages.

The example operation message 500 depicted in FIG. 5 contains the "GET" operator 502. The operation message 500 includes a merchant data type criterion "ORDERS" 506, which indicates that the "GET" operator 502 should only operate over merchant data with the type "order." The operation message 500 also includes an attribute criterion 510, indicating that "GET" operator 502 should be applied to merchant data that includes a "STATUS" attribute. Finally, the operation message 500 contains a value criterion 512 related to the attribute criterion 510, indicating that the "GET" operator 502 should be applied to merchant data with a value "UNSHIPPED" for the "STATUS" attribute. The operation message 500 also specifies a result type 504, here "COUNT." Other types of result are discussed below with respect to FIG. 6. Once the operation message is transmitted to the interactive computing system 110, it may be processed and the results returned as a result message 550, as shown in FIG. 5B.

Figure 6:
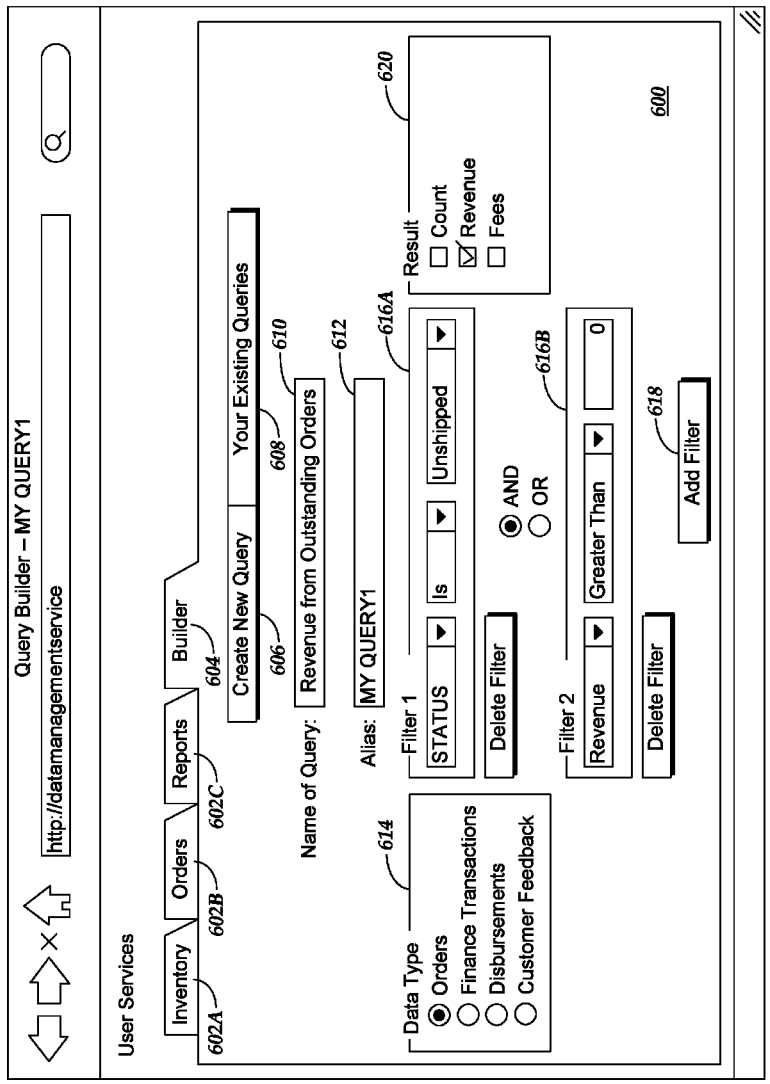
FIG. 6 depicts an embodiment of a user interface through which a user may define custom queries.

FIG. 6 depicts an example user interface 600 that may be used to build custom operations (such as queries to be run on user data) and/or to display user data. While the example user interface 600 is depicted as part of a content page accessed through a network browser, the user interface 600 may be rendered in other environments as well. For example, the example user interface 600 may be displayed as part of a software application provided with the user computing device 102.

The user interface 600 may include merchant data tabs 602A-602C, through which the user may directly observe merchant data. Methods for displaying data through a user interface are well known in the art and need not be discussed in further detail herein.

The user interface 600 may include a query builder tab 604. The query builder tab may include a "create new query" control 606 and a "your existing queries" control 608. By interacting with the "create new query" control 606, the user may be able to create a new custom query by interacting with other elements of the user interface 600. By interacting with the "your existing query" control 608, the user may be able to view and optionally modify queries and other operations previously defined.

The user may provide a custom name for the custom query in the name input field 610. This custom name may be displayed if the user accesses the list of custom queries and other operations by interacting with the "your existing queries" control 608.

The user may also associate an alias with the custom query in the alias input field 612. This alias may be included in an operation message generated by the user on his or her user computing device 102. When the operation message containing the alias is received by the interactive computing system 110, the custom operation may be performed by the interactive computing system 110 on user data stored in the user data store 104.

A merchant data type on which the custom operation should be run may be specified in merchant data type pane 614. For example, merchant data types on which an operation may be run may include order data; personnel data; customer data; supplier data; and other types of data related to the merchant's business, such as financial transactions; disbursements; and customer feedback.

One or more criteria, such as filters, may be specified in criteria fields 616A and 616B. Generally described, criteria may include logic for deciding upon what user data an operation should be performed. This logic may include Boolean logic; algebraic logic (e.g., equalities and/or inequalities, or determining whether a value of an attribute is in a certain range); or other forms of logic. This logic may be used to filter user data such that an operation is performed on some user data but not on other user data, as shown in FIG. 6, though other applications of the logic are possible. For example, the criterion 616A includes a logical test that is satisfied by user data whose status attribute has an unshipped value. The criterion 616B includes a logical test that is satisfied by user data whose revenue attribute is above a certain value. Multiple criteria may also be joined with logical operators, such as a Boolean "and" or "or" operator. The user may add one or more criteria with by interacting with the "add new criterion" control 618.

Finally, the user may specify what type of result he or she desires in result selection pane 620. Generally described, a result may be an attribute value of user data, a count of user data that satisfies the specified criteria, or numerical output derived from the values of one or more attributes of user data that satisfy the specified criteria. For example, a merchant may desire a count of order merchant data that satisfy the one or more criteria (e.g., to indicate a number of orders), or the merchant may desire that the data management service compute a sum of the revenue values of several orders. Still other types of results may be generated by the data management service. Results of the type specified by the user may be included in a response message generated by the interactive computing system 110 and transmitted to the user computing device 102.

Figures 7A, 7B:
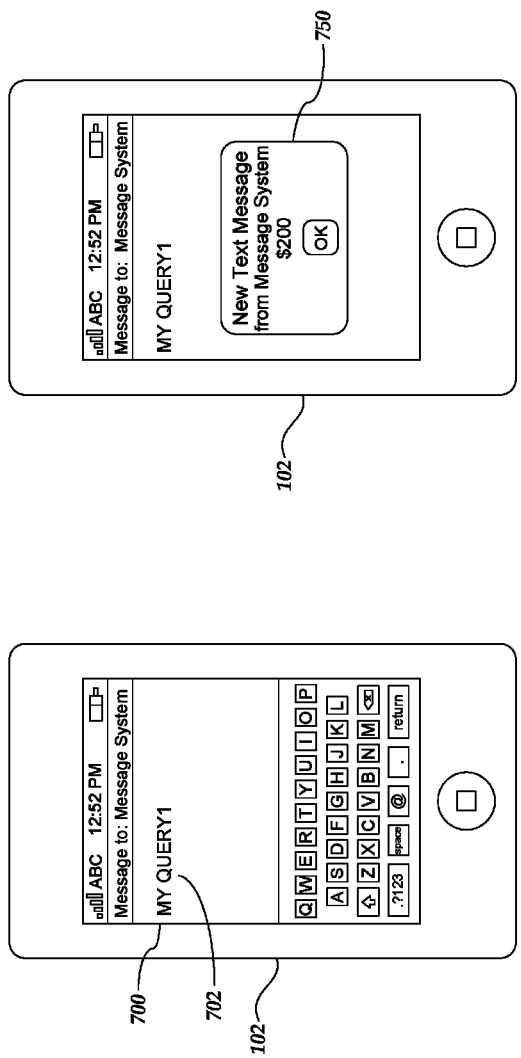
FIG. 7A and FIG. 7B depict embodiments of user interfaces that depict a custom operation message and a result message of the custom operation.

FIG. 7A depicts an example user computing device 102 with an example operation message 700 that includes a custom operation alias 702. Here, let's say that the custom operation alias includes a "GET" operator for the value of the attribute "PRICE" for order merchant data with a "FULFILLMENT STATUS" attribute whose value is "UNSHIPPED." It would be relatively inconvenient for the merchant to have to input all of those operators and criteria into each operation message, but relatively convenient for the merchant to simply input the custom operation alias 702. When the operation message 700 containing the custom operation alias 702 is transmitted to the interactive computing system 110 from the user computing device 102, the interactive computing system 110 may retrieve the custom operation from the custom operation store 108 and perform the operation on the user data store 104. The results may be returned to the user computing device 102 as a result message 750.

Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

The invention claimed is:

1. A method for managing operations on user data, the method comprising:
outputting a user interface configured to provide functionality for a user to define operators and criteria for creating one or more custom operations to be performed on user data with respect to one or more orders represented in an electronic catalog, the user data being stored in an electronic user data store;
receiving an operation text message from a user computing device, the operation text message indicating a custom operation of the one or more custom operations to be performed on the user data;
in response to receiving the operation text message, performing, by a computer system comprising computer hardware, the indicated custom operation on the user data;
generating a result message, the result message comprising at least one of an operation result and a network resource link to a content page displaying the operation result; and
transmitting the result message to the user computing device.

2. The method of claim 1, further comprising:
associating the user data with the user; and
determining if the user computing device from which the operation message is received is associated with the user;
wherein the indicated custom operation is only performed on the user data if both the user computing device and the user data are associated with the user; and
wherein the result message is only generated and transmitted if both the user computing device and the user data are associated with the user.

3. The method of claim 2, further comprising associating the user with a security credential, and wherein the user computing device from which the operation message is received is determined to be associated with the user if the operation message comprises the security credential.

4. The method of claim 3 wherein the security credential comprises one or more of the following: a password, a personal identification number, digital certificate, and a digital signature.

5. The method of claim 2 further comprising receiving a registration of a secure user identifier of the user computing device, and wherein the user computing device from which the operation message is received is determined to be associated with the user if the user computing device is associated with a registered secure user identifier.

6. The method of claim 1, wherein:
the user data comprises one or more attributes, each attribute having a value;
the indicated custom operation comprises a request for a value of the one or more attributes of the user data; and
the result comprises an indication of the value of the one or more attributes of the user data.

7. The method of claim 1, wherein:
the user data comprises one or more attributes, each attribute having a value;
the indicated custom operation comprises an update to a value of the one or more attributes of the user data; and
the result comprises an indication of the updated value of the one or more attributes of the user data.

8. The method of claim 1, wherein:
the indicated custom operation comprises a deletion of user data; and
the result comprises an indication that the user data has been deleted.

9. The method of claim 1, further comprising:
receiving a selection of a criterion for designating user data entries stored in an electronic data store;
receiving a selection of an operation to be applied to the designated user data; and
receiving a selection of an alias;
associating the alias with the selected criterion and the selected operation;
wherein the operation text message comprises the alias; and
wherein the indicated custom operation is the selected operation.

10. The method of claim 9, further comprising:
receiving a selection of a result type; and
associating the selected result type with the alias;
wherein the operation result comprises an indication of a result of the selected result type.

11. The method of claim 10, wherein the result type is a count of designated user data.

12. The method of claim 9, wherein:
the user data comprises one or more attributes, each attribute having a value;
the selected criterion comprises a logical test to be performed on a value of an attribute of user data; and
the user data is designated if the value of the attribute satisfies the logical test.

13. The method of claim 1, wherein the custom operation indicated in the operation text message is an alias associated with the custom operation.

14. A system for enabling merchants to remotely access merchant information, the system comprising:
a user data store configured to store user data;
a user interface configured to provide functionality for a user to define operators and criteria for creating one or more custom operations to be performed on the user data with respect to one or more orders represented in an electronic catalog; and
a computing system comprising computer hardware in communication with the user data store, the computing system configured to:
receive an operation text message from a user computing device, the operation text message configured to indicate a custom operation of the one or more custom operations to be performed on the user data;
in response to receiving the operation text message, perform the indicated custom operation on the user data;
generate a result message, the result message comprising at least one of an operation result and a network resource link to a content page displaying the operation result; and
transmit the result message to the user computing device.

15. The system of claim 14, the computing system further configured to:
associate the user data with the user; and
determine if the user computing device from which the operation message is received is associated with the user;
wherein the indicated custom operation is only performed on the user data if both the user computing device and the user data are associated with the user; and
wherein the result message is only generated and transmitted if both the user computing device and the user data are associated with the user.

16. The system of claim 15, the computing system further configured to associate the user with a security credential, and wherein the user computing device from which the operation message is received is determined to be associated with the user if the operation message comprises the security credential.

17. The system of claim 16 wherein the security credential comprises one or more of the following: a password, a personal identification number, digital certificate, and a digital signature.

18. Non-transitory computer storage medium having stored thereon computer readable instructions which when executed by a processor cause the processor to:
output a user interface to provide functionality for a user to define operators and criteria for creating one or more custom operations to be performed on user data with respect to one or more orders represented in an electronic catalog, the user data being stored in an electronic data store;
store the at least one custom operation in a custom operation data store;
receive an operation text message from a user computing device, the operation text message configured to indicate a custom operation of the one or more custom operations to be performed on the user data;
in response to receiving the operation text message, perform the indicated custom operation on the user data;
generate a result message, the result message comprising at least one of an operation result and a network resource link to a content page displaying the operation result; and
transmit the result message to the user computing device.

19. The non-transitory computer storage of claim 18, the user data management module further configured to:
receive a selection of a criterion for designating user data entries stored in an electronic data store;
receive a selection of an operation to be applied to the designated user data; and receive a selection of an alias;

associate the alias with the selected criterion and the selected operation;

wherein the operation text message comprises the alias; and wherein the indicated custom operation is the selected operation.

20. The non-transitory computer storage of claim 19, wherein:

the user data comprises one or more attributes, each attribute having a value;

the selected criterion comprises a logical test to be performed on a value of an attribute of user data; and the user data is designated if the value of the attribute satisfies the logical test.

21. The non-transitory computer storage of claim 19, the user data management module further configured to:

receive a selection of a result type; and associate the selected result type with the alias;

wherein the operation result comprises an indication of a result of the selected result type.

22. The non-transitory computer storage of claim 21, wherein the result type is a count of designated user data.

* * * * *